No. 799,180. PATENTED SEPT. 12, 1905.
J. N. McCLINTOCK.
FILTERING APPARATUS.
APPLICATION FILED JUNE 3, 1902.
2 SHEETS—SHEET 1.
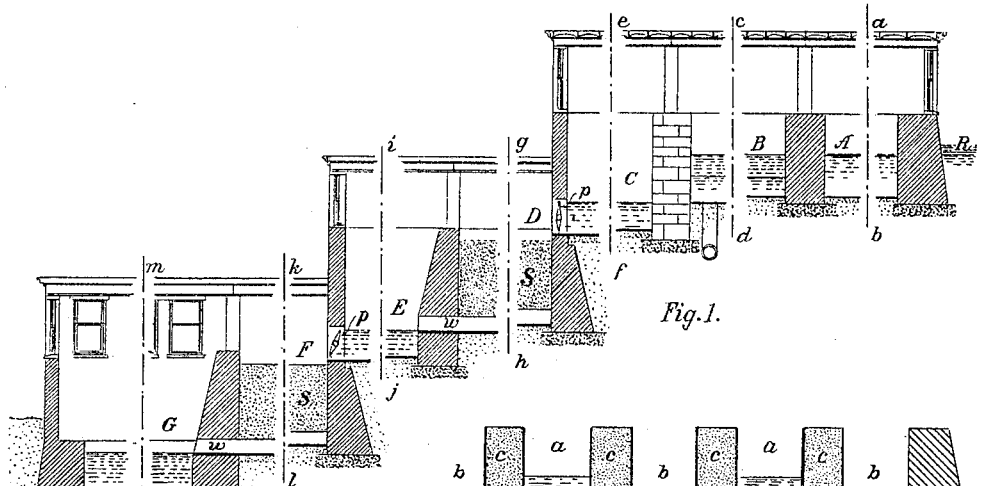
Fig. 1.
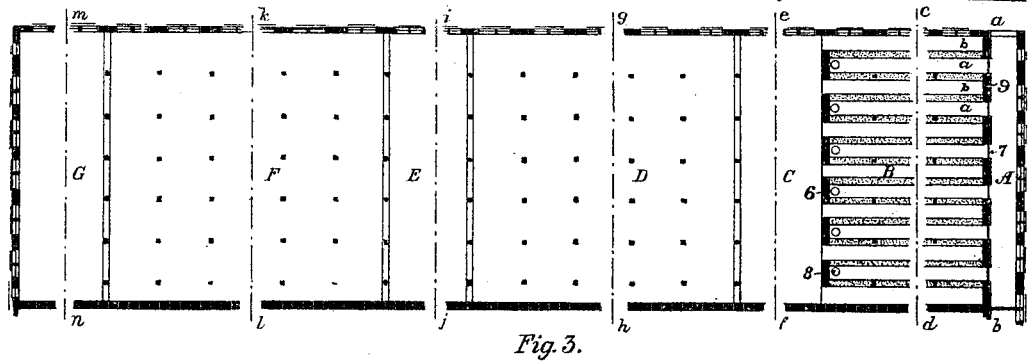
Fig. 2.
Fig. 3.
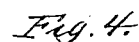
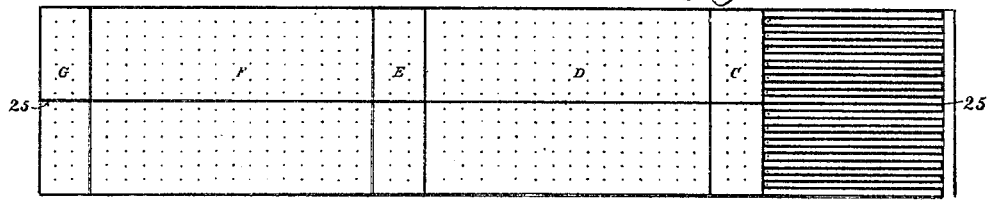
Fig. 8.
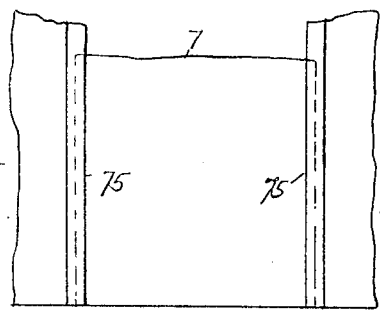
WITNESSES:
C. H. Gannett
J. Murphy
INVENTOR.
John N. McClintock
BY Jas. H. Churchill
ATTORNEY.

UNITED STATES PATENT OFFICE.

JOHN N. McCLINTOCK, OF BOSTON, MASSACHUSETTS.

FILTERING APPARATUS.

No. 799,180. Specification of Letters Patent. Patented Sept. 12, 1905.

Application filed June 3, 1902. Serial No. 110,080.

*To all whom it may concern:*

Be it known that I, JOHN N. McCLINTOCK, a citizen of the United States, residing in Boston, in the county of Suffolk and State of Massachusetts, have invented an Improvement in Filtering Apparatus, of which the following description, in connection with the accompanying drawings, is a specification, like characters on the drawings representing like parts.

This invention relates to a filtering apparatus especially designed and adapted for the purification of the water-supply of cities and towns, but which may also be employed for the purification of sewage. For this purpose I employ a plurality of septic-tanks arranged alongside of one another and separated by a chamber or space, into which the filtered water may pass from said septic-tanks, the latter having its side walls composed of filtering material, as will be described. The septic-tanks may and preferably will communicate with a main supply chamber, channel, or duct, and each of said tanks may be provided with a suitable gate or valve to control admission of the impure water. The chambers or spaces between adjacent septic-tanks may and preferably will communicate with a collecting-tank which communicates with a chamber containing a filter-bed, through which the purified or partially-purified water passes into a well, which may be provided with a gate or valve controlling the flow of water onto a second filter-bed, if desired. The water in the collecting-tank may be permitted to flow onto a filter-bed in which bacterial life is cultivated and from which it is drawn or siphoned off onto one of the filter-beds above referred to. These and other features of this invention will be pointed out in the claims at the end of this specification.

Figure 5:
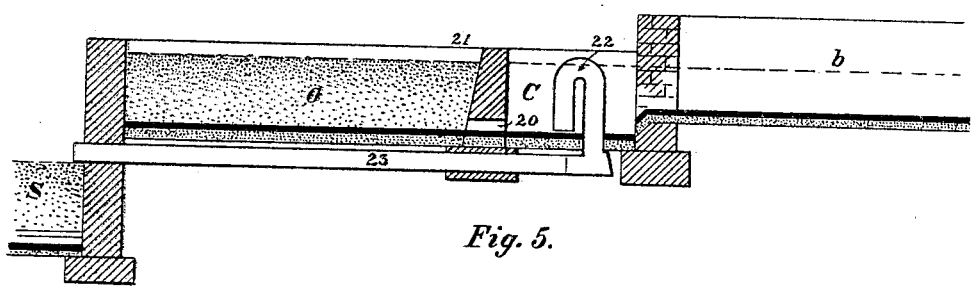
Figure 6:
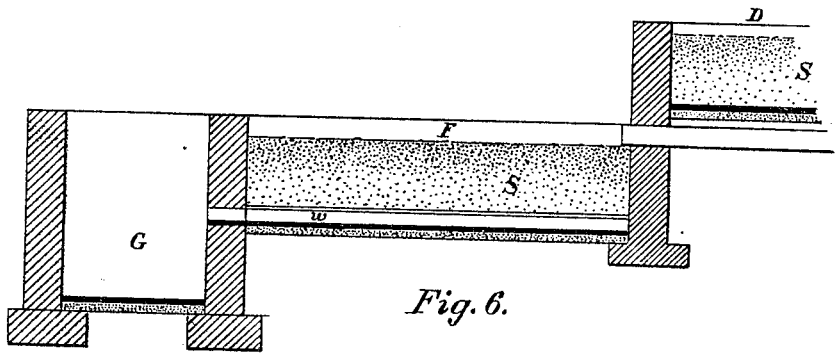
Figure 7:
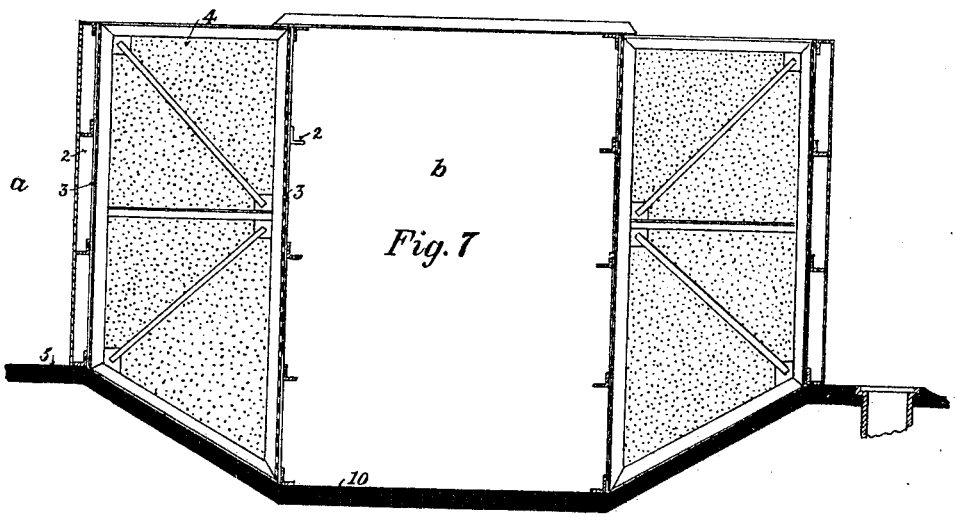

Figure 1 represents in section a filtering plant or apparatus embodying this invention; Fig. 2, a detail of the septic-tanks and collecting-channels; Fig. 3, a plan view of the apparatus shown in Fig. 1, the house or inclosing structure being omitted; Fig. 4, a diagrammatic plan showing two filtering apparatus arranged for intermittent filtration; Figs. 5 and 6, sectional details to be referred to which are to be read together; Fig. 7, a sectional detail showing the construction preferred by me of the side walls of the septic-tank, and Fig. 8 a detail to be referred to.
In accordance with this invention I employ a battery of filtering channels, chambers, or tanks *a*, (shown in Fig. 3 as six in number,) each channel or tank having filtering side walls *c*, preferably made as shown in Fig. 7 and each comprising an open framework 2, of iron or other material, which is substantially closed by a facing of foraminous material—such as wire-netting 3, sheets of cloth, of cotton, linen, hemp, asbestos, or other suitable material— and an intermediate body 4 of coke, charcoal, cinders, or other filtering material. The bottom of the channel or septic-tank *a* is preferably covered with a layer 5 of cement, and the channel or tank is closed at one end by a suitable wall 6, which may be composed of filtering material, like the side walls, or which may be of masonry. The opposite or front end of the channel or septic-tank *a* is left open and is provided with a valve or gate 7, which controls communication between the septic-tank and a main supply channel or duct A. The gate or valve 7 may be of any suitable construction, such as a vertically-movable gate, as represented in Fig. 8, wherein the gate or valve is shown as sliding in suitable guides 75 and in practice are elevated by suitable machinery in a manner well understood. The bottoms of the septic-tanks are preferably inclined from their front toward their rear end and are provided with suitable outlet-pipes 8, provided with suitable valves. (Not herein shown.) The septic-tanks *a* are arranged side by side, but are separated to leave channels, chambers, or spaces *b* open at their rear end and closed at their front end by suitable walls 9, which may be of masonry.

The collecting-channels *b* receive the filtered water which has passed through the side walls of the septic-tanks and convey the same into a common chamber or collecting-tank C. The collecting-channels *b* are preferably made of a greater depth than the septic-tanks, so that the bottoms of said collecting-channels may be below the bottoms of the septic-tanks, as indicated in Fig. 2. The bottom of the collecting-chambers is preferably covered with a layer 10 of cement, and the side walls of the septic-tanks also rest on a layer of cement. The outer surface of the side walls is preferably made deeper or longer than the inner surface of said side walls, as shown in Figs. 2 and 7, so that all the water in the tanks *a* may filter off into the collecting-channels *b*. The collecting-channels *b* communicate with the collecting-tank C, which has its bottom at a lower level than the bottom of the said collecting-channels, and the said collecting-tank communicates with a chamber or tank D, containing a filter-bed S, the upper surface of which is substantially on a level with the bottom of the collecting-tank. The discharge of the water from the collecting-tank C may be controlled by suitable gates or valves $p$, which when opened permit the water to flow onto the surface of the filter-bed S, down through which it percolates and flows through the under drain $w$ into a well or chamber E, located at a lower level than the filter-bed S. The filtered water may, if desired, be discharged from the well or chamber E onto a second filter-bed S', contained in the chamber F, and after passing through the filter-bed S' the water may be conducted by the drain $w'$ into the well G, from which it may be drawn off by a pump or by gravity.

In operation with the apparatus shown in Figs. 1 and 3 the impure water is taken from the river or other source of supply and led into the supply duct or channel A, from which it passes into the septic-tanks $a$, whose inlet gates or valves 7 are opened. The impure water passes out of the septic-tanks through the side walls of filtering material into the collecting-channels. On its passage through the side walls of the septic-tanks the water is clarified, and most of the suspended organic matter, as well as the suspended inorganic matter, and also much of the dissolved organic matter are removed. The filtered water accumulated in the collecting-tank C is spread over the filter-bed S in one dose, preferably to the depth of about six inches. This water will drain down into the filter-bed of sand or other material, and the next dose of water from the collecting-tank forces air and water into the under drains, and in a very short time after the filter-bed is set in operation bacterial life will be formed on the surface and on the particles of sand, which life will be cultivated by the air supplied to them and sustained by the organic impurities carried in solution in the water. The impurities in the water will generate bacterial life, and if there are no impurities and the water is sterile there is no life and no need of life. The same operation is continued in the second filter, thus exposing every particle of water which has been strained through the coke filters continuously and there subjected to the action of the anaerobic bacteria, which work without air, twice to the action of the aerobic bacteria and the oxidation of the air.

If it is desired to increase the aerobic bacteria, a cultivating-bed O may be interposed between the collecting-tank C and the filter D, as represented in Fig. 5, wherein the collecting-tank C is shown as connected by a passage 20 with the bottom of a tank or chamber 21, located on the same level as the collecting-tank C and containing the bed O of sand through which the effluent or partially-filtered water rises to the level of the top of a siphon 22, located in the collecting-tank C. The siphon 22 has its outlet-pipe 23 extended under the bed O and into the filter-chamber D, above the bed S therein.

In practice I prefer to arrange the filtering apparatus in batteries of two or more, as represented in Fig. 4, with a dividing-wall 25, of masonry, separating the apparatus, so that an intermediate filtration may be carried on.

From the above description it will be seen that any one or more of the septic-tanks $a$ may be closed by their valves or gates 7 and flushed out with a hose or cleansed by brushing or scrubbing the walls of the same.

By reference to Fig. 1 it will be seen that the water accumulated in the collecting-tank may be intermittently and preferably automatically discharged upon the filter-bed S or upon the bacteria-cultivating bed O.

In Fig. 5 I have shown the bacteria-cultivating bed as located on a level with the collecting-tank C; but, if desired, it may be located on a lower level and the water from the tank C flowed onto the surface of said bed, and when the bed is thus filled to the top of the filtering material it may be allowed to rest one hour or more and then drawn off through a siphon, after the mannner described with relation to Fig. 5. I may prefer to inclose the apparatus with a suitable structure or building, as represented in Fig. 1, or I may omit any part.

This apparatus would clarify and purify the effluent of a city sewer and remove the silt from river water on the face of the first coke filter by aid of cloth screens, which can be replaced and cleaned, permitting the process of purification by sedimentation and septic action in the septic-tank, straining through the screens and the vertical coke filters, and the nitrifying action and oxidizing action in the filters. The septic-tanks may also be kept ordinarily full by maintaining the valve $p$ closed.

I claim—

1. In an apparatus of the class described, the combination with a water-inlet duct or channel, of a plurality of septic-tanks communicating with said inlet-channel and separated from one another to form collecting-channels, independent gates or valves to control the admission of fluid from said inlet-channel into each of said septic-tanks, the said septic-tanks having side walls composed of filtering material through which the fluid passes into the said collecting-channels and an outlet for each of said collecting-channels, substantially as described.

2. In an apparatus of the class described, the combination with a plurality of septic-tanks having filtering side walls and separated to form a collecting-channel between adjacent septic-tanks, inlet-valves for said tanks, of a collecting-chamber connected with said channels independent of said septic-tanks and into which the collecting-channels discharge, and a filter-bed located at a lower level than said collecting-chamber and onto which the fluid from the collecting-tank is adapted to be discharged, substantially as described.

3. In an apparatus of the character described, the combination with a plurality of septic-tanks having filtering side walls and separated to form collecting-channels, inlet-valves for said tanks, of a collecting-tank connected with said channels independent of said septic-tank and into which said collecting-channels discharge, a filter-bed located at a lower level than the collecting-tank, means to control the discharge of fluid from the collecting-tank onto the said filter-bed, and a well in communication with said filter-bed, substantially as described.

4. In an apparatus of the character described, the combination with a plurality of septic-tanks having filtering side walls and separated to form collecting-channels, of a collecting-tank into which said collecting-channels discharge, a filter-bed located at a lower level than the collecting-tank, means to control the discharge of fluid from the collecting-tank onto the said filter-bed, a well in communication with said filter-bed, a second filter-bed located at a lower level than said well, and a second well communicating with said second filter-bed, substantially as described.

In testimony whereof I have signed my name to this specification in the presence of two subscribing witnesses.

JOHN N. McCLINTOCK.

Witnesses:
 JAS. H. CHURCHILL,
 J. MURPHY.